United States Patent

Rosmann et al.

Patent Number: 5,681,012
Date of Patent: Oct. 28, 1997

[54] SPACECRAFT CONTROL WITH SKEWED CONTROL MOMENT GYROS

[75] Inventors: David J. Rosmann, Santa Monica; John W. Smay, Redondo Beach; Harold A. Rosen, Santa Monica, all of Calif.

[73] Assignee: Hughes Electronics, Los Angeles, Calif.

[21] Appl. No.: 368,830

[22] Filed: Jan. 5, 1995

[51] Int. Cl.$^6$ .................................................. B64G 1/28
[52] U.S. Cl. ............................................................ 244/165
[58] Field of Search ................................. 244/120, 164, 244/165, 3.23; 364/433, 434

[56] References Cited

U.S. PATENT DOCUMENTS

| | | | |
|---|---|---|---|
| 3,471,105 | 10/1969 | Yarber et al. | 244/165 |
| 3,741,500 | 6/1973 | Liden | 244/165 |
| 5,012,992 | 5/1991 | Salvatore | 244/165 |
| 5,279,483 | 1/1994 | Blancke et al. | 244/165 |

OTHER PUBLICATIONS

Cummings et al "Skewed Versus Orthogonal Reaction Wheels for Outer Planet Exploration" AAS Conf 1971.
Ramos, "Air Bearing Testing of a Skewed Reaction Wheel System for Attitude Control", CCMSAT Tech Rev vol. 9 No. 1 Spring 1979 pp. 157–202.

*Primary Examiner*—Galen L. Barefoot
*Attorney, Agent, or Firm*—Elizabeth E. Leitereg; Terje Gudmestad; Wanda K. Denson-Low

[57] ABSTRACT

A method of and system for applying single gimbal control moment gyros to spacecraft attitude control employing two control moment gyros with nominal spin axes anti-parallel and gimbal axes displaced at a fixed angle in the plane normal to the nominal spin axes to achieve two orthogonal body fixed control torques using two wheels. If the gimbal axis displacement of each of three wheels is 120 degrees, two wheels provide independent uncoupled orthogonal two-axis control, and the third can substitute, in the event of failure, for either of the two requiring no change in control law or performance.

17 Claims, 2 Drawing Sheets

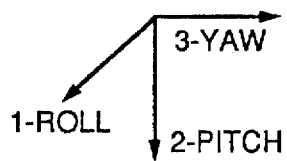
FIG. 1a.
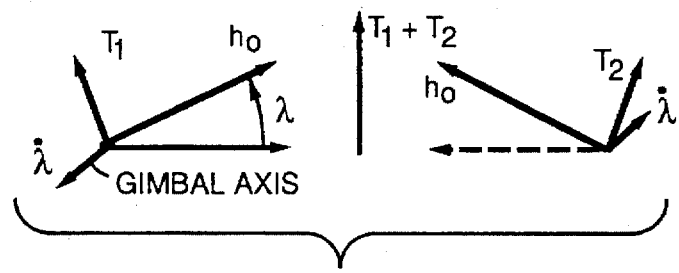
FIG. 1b.
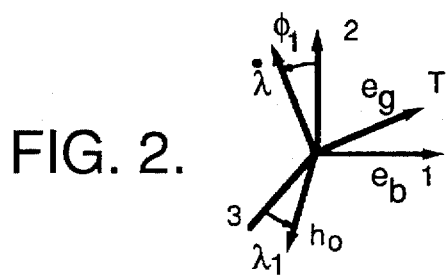
FIG. 2.
FIG. 3.
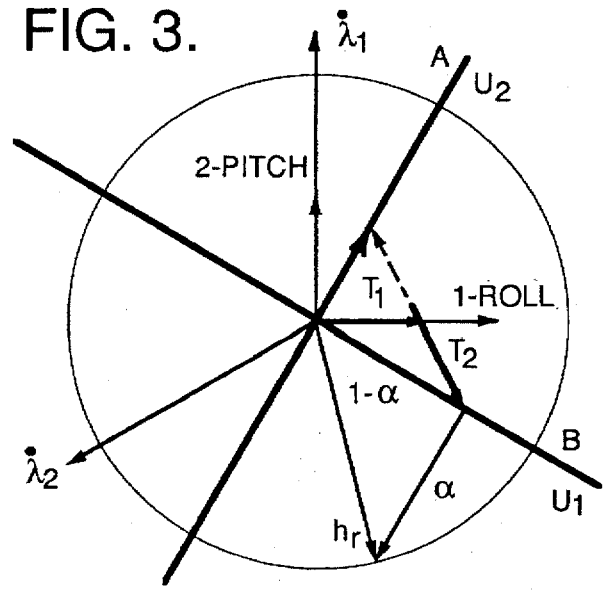

5,681,012

SPACECRAFT CONTROL WITH SKEWED CONTROL MOMENT GYROS

FIELD OF THE INVENTION

The invention relates to a spacecraft control, and more specifically, to a novel method of attitude control by means of single gimbal control moment gyros (SGCMG) for spacecrafts that require rapid and frequent reorientation of the spacecraft attitude.

BACKGROUND OF THE INVENTION

A CMG is a spinning momentum wheel that is gimbaled with respect to a spacecraft body about one or both axes nominally orthogonal to its momentum vector, thus permitting controlled rotation of the wheel in the spacecraft body. This rotation applies very large torques to the spacecraft body producing rapid acceleration. CMGs are virtually always employed when a large spacecraft has to be reoriented rapidly and frequently, where the fuel consumption associated with using thrusters is impractical.

In most agile spacecraft applications, high torque agile motion is only required about two axes, viz. roll and pitch in order to point some payload line-of-sight toward a target. Rotation of a single CMG produces a rotating torque in the spacecraft body, while an ideal control actuator would apply body fixed torques about, for example, each of three orthogonal axes. Typically CMGs are arranged on the edges of a three, four, or five sided pyramid, and a complex matrix transformation is implemented to distribute control torque required in body coordinates among the active wheels in the pyramid.

Many control laws and multiple CMG array configurations have been proposed in the art to satisfy required axis torque and momentum. One of the more useful is the scissor pair array. The array employs two opposing wheel momentum vectors, as depicted in FIG. 1, with anti-parallel gimbal axes. The control law constrains the gimbal rates and angles to be nominally identical. This results in a single axis body fixed torque that can be oriented along any desired axis by properly orienting the wheels. Should the need arise to realize frequent rapid reorientations of a large spacecraft, six wheels would be required using standard scissor pairs for achieving independent uncoupled orthogonal three-axis control, while additional wheels would be required for standby redundancy in the event of failure. Such solution would be rather bulky, expensive, and heavy, the latter being the crucial factor for space applications.

SUMMARY OF THE INVENTION

It is therefore an object of this invention to provide a new, relatively simple, lighter weight, and less expensive means for spacecraft attitude control capable of achieving two axis agile control while retaining high reliability.

The present invention rotates the two gimbal axes a predetermined angle about the common momentum axis and achieves two orthogonal body fixed control torques with the same two wheels. Further, if the gimbal axis displacement of each of three wheels is 120 degrees, two wheels provide independent uncoupled orthogonal two-axis control, and the third can substitute, in the event of failure, for either of the two without changing control law or performance.

A method of positioning a spacecraft according to the present invention comprises the steps of providing at least two single axis control moment gyros; angularly rotating gimbal axes of the gyros a predetermined angle about the common momentum axis for displacement thereof into a skewed scissor pair control arrangement to obtain two-axis control; measuring spacecraft roll and pitch attitude by means of the gyros and forming corresponding signals; producing commanded roll and pitch attitude control signals for a maneuver; combining the produced signals with the formed signals and compensating them to generate torque commands; and applying the torque commands with maneuver sequencing logic to position the spacecraft.

The method of spacecraft attitude control according to the present invention requires that the angularly rotating gimbal axes of the gyros include orienting the gimbal axes in the anti-parallel direction, followed by displacing these gimbal axes at predetermined angles in a plane normal to momentum vectors, and equating angular rates of the gimbals.

The torque commands may be translated to CMG torque coordinates to rotate the spacecraft.

The method according to the present invention also contemplates providing a third single axis control moment gyro for standby redundancy. These gimbal axes are preferably 120° apart.

A spacecraft maneuver control system according to the present invention, comprises a set of sensors for measuring spacecraft roll and pitch attitude to produce corresponding roll and pitch attitude signals, sources of commanded roll and pitch attitude reference signals; means for combining the commanded attitude signals with the sensor attitude signals; a filtering means for compensating the combined signals to generate first and a second torque commands; a first control moment gyro actuator means controlled by the first torque command for applying a first control moment to the spacecraft about the first axis (u); a second control moment gyro actuator means controlled by the second torque command for applying a second control moment to the spacecraft about the second axis (v); the first and the second actuator means being operative to control the attitude of the spacecraft in the roll and pitch directions.

The axes u and v are oriented 120° apart in the roll-pitch (x-y) plane in the preferred implementation of the invention. Wheel momentum vectors of the gyros are oriented in anti-parallel directions, gimbal axes of the array are oriented at predetermined angles in a plane normal to the momentum vectors, and angular rates of the gimbal axes are equated to obtain two-axis control. Control about the third body axis z (yaw) is obtained by reaction to adjustment of the CMG spin motor torques.

The actuator means are controlled by the torque commands through a coordinate rotation means.

The first and the second actuator means are provided with local feedbacks to effect the orienting and equating.

Further advantageous details and embodiments of the invention outlined above will be clearly understood from the ensuing detailed description in connection with the accompanying drawings.

BRIEF DESCRIPTION OF THE DRAWINGS

FIG. 1a shows three axes relative to which maneuvering is performed, and

FIG. 1b diagrammatically illustrates control moment gyros (CMG) scissor pair momentum and gimbal and torque geometry known in the art.

FIG. 2 shows CMG geometry as applied to the present invention.

FIG. 3 illustrates spacecraft repositioning maneuver torque coordinates achievable in accordance with the present invention.

DESCRIPTION OF THE PREFERRED EMBODIMENT OF THE INVENTION

Figure 4:
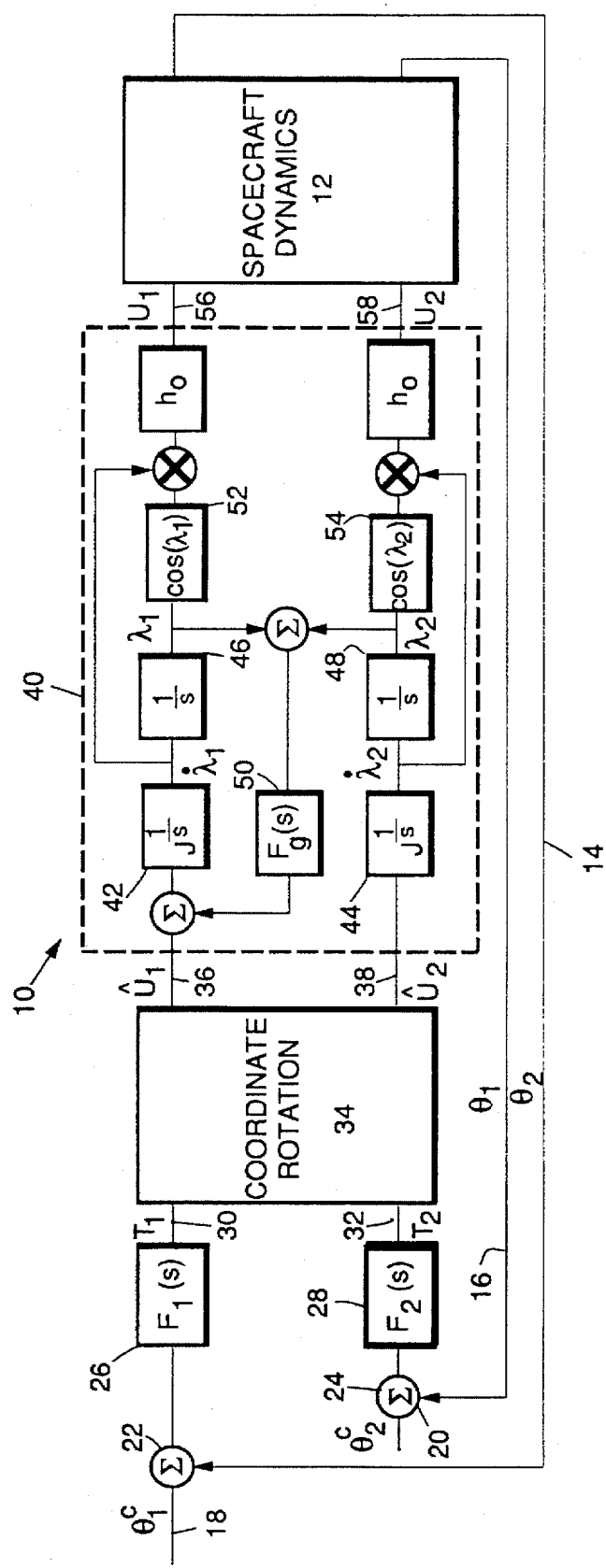
FIG. 4 is a block diagram of a spacecraft CMG maneuver control system according to the present invention.

Torque and momentum equations for the generalized scissor pair CMG array and control law are presented below. Two or three wheels are oriented with momentum vectors $h_o$ parallel and gimbal axes at angles $\phi_1$, $\phi_2$ and $\phi_3$ in the plane normal to the momentum vectors. Two wheels are used at a time, while a third is on standby redundancy.

For $\phi_2=\phi_1\pm180°$, the standard scissor pair results which gives maximum torque for $U_1=2\lambda_1 \cos \lambda_1$ and $U_2=0$, i.e. the available torque is one dimensional. For any other angular orientation, two orthogonal torques are produced. For $\phi_2=\phi_1\pm90°$, $U_1$ and $U_2$ are orthogonal and are reduced in magnitude by +e.fra $1/\sqrt{2}$+ee from the maximum. The case evaluated is $\phi_2=\phi_1\pm120°$ which gives torques from two wheels such that a third wheel can be at $\phi_2\pm120°$ and substitute for either of the original two with no change in the resultant control torque. The control torque directions for the 120° array are constructed graphically as lines A and B on FIG. 3. For this case, one direction of torque is reduced by ½ (A direction) and the other by +e.fra $\sqrt{3}/2$+ee (B direction).

Three significant features of this invention are:

(1) Two single axis control moment gyros with gimbal axes displaced by an angular rotation may be used in a skewed scissor pair control arrangement to obtain two-axis agile control, whereas a standard scissor pair gives only one axis control.

(2) Control of the momentum or spin rate of these same two wheels in a constrained manner provides decoupled control torque about the third axis.

(3) If the two wheel gimbal axes in (1) are 120° apart and a third wheel in standby redundancy is positioned 120° from the first two, it may replace either of the first two in the event of failure, with no change in control law or control capability.

Generalized Scissor Pair SGCMG Kinematics

In order to illustrate and quantify the concept, a highly idealized model neglecting gimbal inertia, etc., is assumed to develop torque and momentum relations for the array configuration of the illustrated embodiment. Consider, as illustrated in FIG. 2, a body vector basis denoted $e_b$ and a CMG gimbal basis $e_g$ which is displaced by angle $\phi_1$ about the 3-axis from $e_b$. Let the CMG have gimbal rate $\dot\lambda_1$ about the 2-axis of $e_g$ and momentum $h_o$ along the 3-axis of $e_g$ when $\lambda_1=0$. Then the gimbal angular rate is $$\dot\lambda_1 = e_g^T\dot\lambda_1[0, 1, 0]^T = e_b^T\dot\lambda_1 A^T[0, 1, 0]^T = e_b^T\dot\lambda_1[-\sin\phi_1, \cos\phi_1, 0]^T, \quad (1)$$

and the wheel momentum is expressed $$h = e_g^T h_o[\sin\lambda_1, 0, \cos\lambda_1]^T = e_b^T h_o A^T[\sin\lambda_1, 0, \cos\lambda_1]^T = e_b^T h_o [\sin\lambda_1\cos\phi_1, \sin\lambda_1\sin\phi_1, \cos\lambda_1]^T \quad (2)$$

The resultant CMG torque is $$T_1(T)=\dot h+\dot\lambda_1 xh=\dot h+e_b^T\dot\lambda_1 h_o[\cos\phi_1\cos\phi_1, \cos\lambda_1\sin\phi_1,-\sin\lambda_1]^T, \quad (3)$$

and for constant wheel speed $$T_1(t)=\dot\lambda_1 xh=e_b^T\dot\lambda_1 h_o[\cos\lambda_a\cos\phi_1, \cos\lambda_1\sin\phi_1,-\sin\lambda_1]^T. \quad (4)$$

Arranging two complementary wheels with momentum vectors in the opposite direction, as in FIG. 1, and combining the torques from both wheels $$U(t) = \quad (5)$$

$$T_1(t) + T_2(t) = \dot\lambda_1 xh + \dot\lambda_2 xh = e_b^T h_0 \begin{bmatrix} \dot\lambda_1\cos\lambda_1\cos\phi_1 - \dot\lambda_2\cos\lambda_2\cos\phi_2 \\ \dot\lambda_1\cos\lambda_1\sin\phi_1 - \dot\lambda_2\cos\lambda_2\sin\phi_2 \\ \dot\lambda_2\sin\lambda_2 - \dot\lambda_1\sin\lambda_1 \end{bmatrix}$$

If $\dot\lambda_1\sin\lambda_1=\dot\lambda_2\sin\lambda_2$, there is no yaw torque. A simple solution to this is $\dot\lambda_1=\pm\dot\lambda_2$ and $\lambda_1=\pm\lambda_2$ $$U_1(t) = e_b^T 2h_0\dot\lambda_1\cos\lambda_1\sin\{(\phi_1 - \phi_2)/2\} \begin{bmatrix} \cos\{(\phi_1 + \phi_2 - \pi)/2\} \\ \sin\{(\phi_1 + \phi_2 - \pi)/2\} \\ 0 \end{bmatrix} = \quad (6a)$$

$$e_b^T \sqrt{3}\; h_0\dot\lambda_1\cos\lambda_1 \begin{bmatrix} \cos 30° \\ -\sin 30° \\ 0 \end{bmatrix} ; \begin{matrix} \dot\lambda_1 = +\dot\lambda_2 \\ \lambda_1 = +\lambda_2 \end{matrix}$$

$$U_2(t) = e_b^T 2h_0\dot\lambda_1\cos\lambda_1\cos\{(\phi_1 - \phi_2)/2\} \begin{bmatrix} \sin\{(\phi_1 + \phi_2 - \pi)/2\} \\ \cos\{(\phi_1 + \phi_2 - \pi)/2\} \\ 0 \end{bmatrix} = \quad (6b)$$

$$e_b^T h_0\dot\lambda_1\cos\lambda_1 \begin{bmatrix} \cos 60° \\ \sin 60° \\ 0 \end{bmatrix} ; \begin{matrix} \dot\lambda_1 = -\dot\lambda_2 \\ \lambda_1 = -\lambda_2 \end{matrix}$$

Hence, by suitably constraining the two gimbal rates and angles, orthogonal torques $U_1$, $U_2$ and no torque on the third axis (yaw) are produced in body coordinates.

Adding angular momentum from the two opposing wheels using (2) yields $$h_1 = e_b^T 2h_0\sin\lambda_1\sin\{(\phi_1 - \phi_2)/2\} \begin{bmatrix} \cos\{(\phi_1 + \phi_2 - \pi)/2\} \\ \sin\{(\phi_1 + \phi_2 - \pi)/2\} \\ 0 \end{bmatrix} = \quad (7a)$$

$$e_b^T \sqrt{3}\; h_0\sin\lambda_1 \begin{bmatrix} \cos 30° \\ -\sin 30° \\ 0 \end{bmatrix} ; \begin{matrix} \dot\lambda_1 = +\dot\lambda_2 \\ \lambda_1 = +\lambda_2 \end{matrix}$$

$$h_2 = e_b^T 2h_0\sin\lambda_1\cos\{(\phi_1 - \phi_2)/2\} \begin{bmatrix} \sin\{(\phi_1 + \phi_2 - \pi)/2\} \\ \cos\{(\phi_1 + \phi_2 - \pi)/2\} \\ 0 \end{bmatrix} = \quad (7b)$$

$$e_b^T h_0\sin\lambda_1 \begin{bmatrix} \cos 60° \\ \sin 60° \\ 0 \end{bmatrix} ; \begin{matrix} \dot\lambda_1 = -\dot\lambda_2 \\ \lambda_1 = -\lambda_2 \end{matrix}$$

Sizing

Any vehicle repositioning maneuver may be broken into two or more incremental segments along A and B (FIG. 3) as the CMGs must be used as a slaved pair to achieve torques confined to the 1-2 plane. Suppose that $h_r=\Delta\theta I/\Delta t$ is the requirement defined by the need to move a vehicle of inertia I through angle $\Delta\theta$ in time $\Delta t$. This is represented by the circle of radius $h_r$ on FIG. 3, and it is required that $\Delta\theta$ be in any direction. The trajectory to any point on the circle may be constructed by two segments along which the rates are $$\omega_A = h_o\sin\lambda_1/I_A \quad (8a)$$

$$\omega_B = \sqrt{3}h_o\sin\lambda_1/I_B \quad (8b)$$

To a first approximation $$[\omega_A\alpha\Delta t]^2+[\omega_B(1-\alpha)\Delta t]^2=\{[h_o\sin\lambda_1/I_A]\alpha\Delta t\}^2+\{[\sqrt{3}h_o\sin\lambda_1/I_B](1-\alpha)\Delta t\}^2=\Delta\theta^2=\{h_r\Delta t/I\}^2 \quad (9)$$

and solving for $h_o$, and maximizing over $\alpha \in (0, 1)$, $$h_0^2 = \frac{(h_r/I)^2[1/\sin\lambda_1]^2}{[\alpha/I_A]^2 + 3[(1-\alpha)/I_B]} \quad (10)$$

$$\frac{[h_r/\sin\lambda_1]^2}{4\alpha^2 - 6\alpha + 3} \leq \frac{4}{3} [h_r/\sin\lambda_1]^2 \text{ at } \alpha = 3/4,$$

or $$h_0 \leq 2/\sqrt{3} \; h_r/\sin\lambda_1 = 1.15 h_r/\sin\lambda_1. \quad (11)$$

Implementation

FIG. 4 shows the control system and wheel kinematics block diagram of a realization of the CMG control according to this invention. A spacecraft CMG maneuver control system 10 is shown as interfacing spacecraft dynamics 12 of the spacecraft, and includes a set of sensors, e.g., earth, sun, star, and/or gyros (not shown), measuring spacecraft roll 14 and pitch 16 attitude. These sensor measurements are combined with commanded attitudes $\theta_1^c$ 18 and $\theta_2^c$ 20 in combining means 22 and 24 and transformed by filters $F_1(s)$ 26 and $F_2(s)$ 28 into torque commands $T_1$ 30 and $T_2$ 32. The torque commands $T_1$, $T_2$ are processed by a coordinate rotation function 34 to take into consideration the configuration of the momentum wheels (how the wheels are mounted). The spacecraft torques are translated in coordinate rotation 34, if required, to CMG torque coordinates $\hat{U}_1$ 36 and $\hat{U}_2$ 38 and allocated to the wheels in a manner consistent with how the wheels are oriented. However, the CMG's may be positioned so that no such rotation is necessary.

These commands are applied to a CMG actuator 40 with maneuver sequencing logic as necessary to position and reposition the spacecraft (not shown). They are scaled by CMG inertia and integrated at the 1/Js integration functions 42, 44 to obtain whee rates $\dot{\lambda}_1$, $\dot{\lambda}_2$ and subsequently integrated in 1/s transform functions 46, 48, thereby producing wheel position $\lambda_1, \lambda_2$. $F_g(s)$ 50 functions to slave the two wheel positions together to achieve the torque model developed above.

The output torques $U_1$, $U_2$ are proportional to the cosine of gimbal angle indicated in 52, 54 as well as gimbal rate. $U_1$ (56) and $U_2$ (58) are wheel torque outputs which act on the spacecraft.

Local inner control loops (not shown) feedback and control the two CMG gimbal rates and angles to approximate the scissor pair constraints described above. The third vehicle axis would be controlled by alternate means such as speed adjustments of the CMGs or by a separate small reaction wheel. Though not agile for the illustrated embodiment, the third axis (yaw) will require some control. A preferred approach is speed control of the two SGCMGs that are controlling roll and pitch, which would reintroduce a small degree of cross-coupling. An alternate would be a separate reaction wheel.

The present invention allows two axis agile control, independent of the third axis with only two CMGs. Uncoupled control is provided about the two active axes, and the third axis is totally decoupled from these axes. The result is a much simpler control law, a much simpler redundancy plan, and the elimination of one or more CMGs compared to competitive implementations. SGCMGs typically weigh well in excess of 100 lbs each.

It should be understood that though the method and the system in accordance with the present invention have been described in detail they may be subjected to modifications and other embodiments incorporating the inventive features. Accordingly, it is intended that the foregoing disclosure is to be considered as illustrating the principles of the invention as an example of those features and not as a delimiting description, which is the purpose of the claims that follow.

We claim:

1. A method of controlling the attitude of a spacecraft, comprising the steps of:
   (a) providing two single axis control moment gyros;
   (b) angularly rotating gimbal axes of said gyros a predetermined angle about a common momentum axis to displace said gyros into a skewed scissor pair control arrangement providing two-axis control of said spacecraft;
   (c) measuring spacecraft roll and pitch attitude using spacecraft sensors and forming corresponding roll and pitch measurement signals;
   (d) producing commanded roll and pitch attitude control signals for a maneuver;
   (e) combining the signals of step (c) with the signals of step (d) to generate torque commands; and
   (f) applying said torque commands to alter the attitude of said spacecraft.

2. The method according to claim 1, wherein said step (b) includes orienting said gimbal axes at said predetermined angles in a plane normal to momentum vectors, and equalizing angular rates of said gimbal axes.

3. The method according to claim 1 further comprising translating said torque commands to torque coordinates of the control moment gyros to rotate said spacecraft.

4. The method according to claim 1 further comprising providing a third single axis control moment gyro.

5. The method according to claim 4, wherein said gimbal axes are oriented 120° apart.

6. A method of spacecraft attitude control using scissor pair arrays of single gimbal control moment gyros, comprising the steps of:
   (a) providing two single axis control moment gyros;
   (b) orienting wheel momentum vectors of said gyros in anti-parallel directions, orienting gimbal axes of said gyros at predetermined angles in a plane normal to said momentum vectors and equalizing angular rates of said gimbals to provide two-axis attitude control of said spacecraft;
   (c) measuring roll and pitch attitude of said spacecraft using spacecraft sensors and forming corresponding measurement signals;
   (d) producing commanded roll and pitch attitude control signals for a maneuver;
   (e) combining said measurement signals with said roll and pitch signals to generate torque commands; and
   (f) applying said torque commands to reposition the attitude of said spacecraft.

7. The method according to claim 6, wherein steps (b)–(f) are repeated at least two times to perform a spacecraft maneuver.

8. The method according to claim 6 further comprising translating said torque commands to torque coordinates of the control moment gyros to rotate said spacecraft.

9. The method according to claim 6 further comprising providing a third single axis control moment gyro.

10. The method according to claim 9, wherein said gimbal axes of said gyros are oriented 120° apart.

11. A spacecraft attitude control system using control moment gyro means, comprising:

a set of sensors for measuring spacecraft roll and pitch attitude to produce corresponding roll and pitch attitude signals;

first and second control moment gyros having momentum wheels whose momentum wheel vectors are oriented in anti-parallel directions, and wherein the momentum wheels are respectively rotatable about first and second gimbal axes, wherein the gimbal axes of said gyros are oriented at a predetermined angle with respect to each other, and wherein the angular rates of said gimbals are equated to provide two-axis control of said spacecraft;

commanded roll and pitch attitude signal sources for producing commanded attitude signals;

means for combining said commanded attitude signals with said roll and pitch attitude signals to produce combined signals;

filtering means for transforming said combined signals to generate first and second torque commands;

a first control moment gyro actuator means controlled by said first torque command for applying a first control moment to said spacecraft about a first axis (x); and a second control moment gyro actuator means controlled by said second torque command for applying a second control moment to said spacecraft about a second axis (y).

12. A spacecraft attitude control system using control moment gyro means, comprising:

a set of sensors for measuring spacecraft roll and pitch attitude to produce corresponding roll and pitch attitude signals, said sensors providing control signals to first and second control moment gyros having first and second momentum wheels that are respectively rotatable about first and second skewed coplanar gimbal axes, wherein said gyros have momentum wheel vectors oriented in anti-parallel directions, and wherein the angular rates of said gimbals are equated to provide two-axis control of said spacecraft;

commanded roll and pitch attitude signal sources for producing commanded attitude signals;

means for combining said commanded attitude signals with said roll and pitch attitude signals to produce combined signals;

filtering means for compensating said combined signals to generate first and second torque commands;

a first control moment gyro means controlled by said first torque command and connected with said first wheel and said spacecraft for applying a first control moment to said spacecraft about a first axis (x); and a second control moment gyro means controlled by said second torque command and connected with said second wheel and said spacecraft for applying a second control moment to said spacecraft about a second axis (y), said first and said second gyro means being operative to control the attitude of said spacecraft.

13. The spacecraft attitude control system according to claim 12, wherein said control of said gyro means by said torque commands is performed through a coordinate rotation means.

14. The spacecraft attitude control system according to claim 12, wherein said first and said second gyro means are provided with local feedbacks to effect said orienting and equating.

15. A spacecraft maneuver control system, comprising:

sensors for measuring spacecraft roll and pitch attitude to produce corresponding roll and pitch attitude signals;

first and second control moment gyros that are arranged as a skewed scissor pair wheel array and that have momentum wheels that are rotatable about first and second gimbal axes, and wherein the gimbal axes are oriented at a predetermined angle with respect to each other;

commanded roll and pitch attitude signal sources for producing commanded attitude signals;

means for combining said commanded attitude signals with said sensor attitude signals to produce combined signals;

filtering means for transforming said combined signals into first and second torque commands;

a first control moment gyro actuator means controlled by said first torque command for applying a first control moment to said spacecraft about a first axis (x) by way of said first control moment gyro; and a second control moment gyro actuator means controlled by said second torque command for applying a second control moment to said spacecraft about a second axis (y) by way of said second control moment gyro, said first and said second actuator means being operative to control the attitude of said spacecraft.

16. The spacecraft maneuver control system according to claim 15, wherein said control of said actuator means by said torque commands is performed through a coordinate rotation means.

17. The spacecraft maneuver control system according to claim 15, wherein said first and said second actuator means are provided with local feedbacks to orient said gimbal axes of said array at predetermined angles in a plane normal to said momentum vectors, and to equate angular rates of said gimbal axes.

* * * * *